United States Patent
Jung et al.

(10) Patent No.: US 8,249,536 B2
(45) Date of Patent: Aug. 21, 2012

(54) APPARATUS AND METHOD FOR REMOVING TRANSMISSION LEAKAGE SIGNAL

(75) Inventors: Sung-chan Jung, Changwon (KR); Su-kyum Kim, Changwon (KR); Young-goo Yang, Suwon (KR)

(73) Assignees: Samsung Techwin Co., Ltd., Changwon (KR); Sungkyunkwan University Foundation for Corporate Collaboration, Suwon (KR)

( * ) Notice: Subject to any disclaimer, the term of this patent is extended or adjusted under 35 U.S.C. 154(b) by 315 days.

(21) Appl. No.: 12/642,252

(22) Filed: Dec. 18, 2009

(65) Prior Publication Data

US 2010/0304701 A1    Dec. 2, 2010

(30) Foreign Application Priority Data

May 27, 2009  (KR) .................. 10-2009-0046503

(51) Int. Cl.
*H04B 1/10* (2006.01)
*H04B 1/18* (2006.01)

(52) U.S. Cl. .............. 455/283; 455/73; 455/83; 455/88; 455/222; 455/296

(58) Field of Classification Search ................ 455/73, 455/83, 88, 570, 114.2, 63.1, 222, 296, 306, 455/307, 282, 283, 278.1
See application file for complete search history.

(56) References Cited

U.S. PATENT DOCUMENTS

| 5,862,466 A | 1/1999 | Erickson |
| 2008/0107093 A1* | 5/2008 | Meiyappan et al. .......... 370/339 |

FOREIGN PATENT DOCUMENTS

| JP | 9-312587 A | 12/1997 |
| JP | 2008-278417 A | 11/2008 |
| KR | 10-2000-0044242 A | 7/2000 |

* cited by examiner

*Primary Examiner* — Tuan Pham
(74) *Attorney, Agent, or Firm* — Sughrue Mion, PLLC

(57) ABSTRACT

An apparatus and method for removing a transmission leakage signal are provided. The apparatus includes: a directional coupler connecting an antenna to a transmission path and a reception path; and a reflection coefficient adjustment unit outputting a reflection signal to the reception path, the reflection signal having the same amplitude as and opposite phase to a first transmission leakage signal generated from the transmission path and input to the reception path and a second transmission leakage signal reflected by the antenna and input to the reception path.

21 Claims, 10 Drawing Sheets

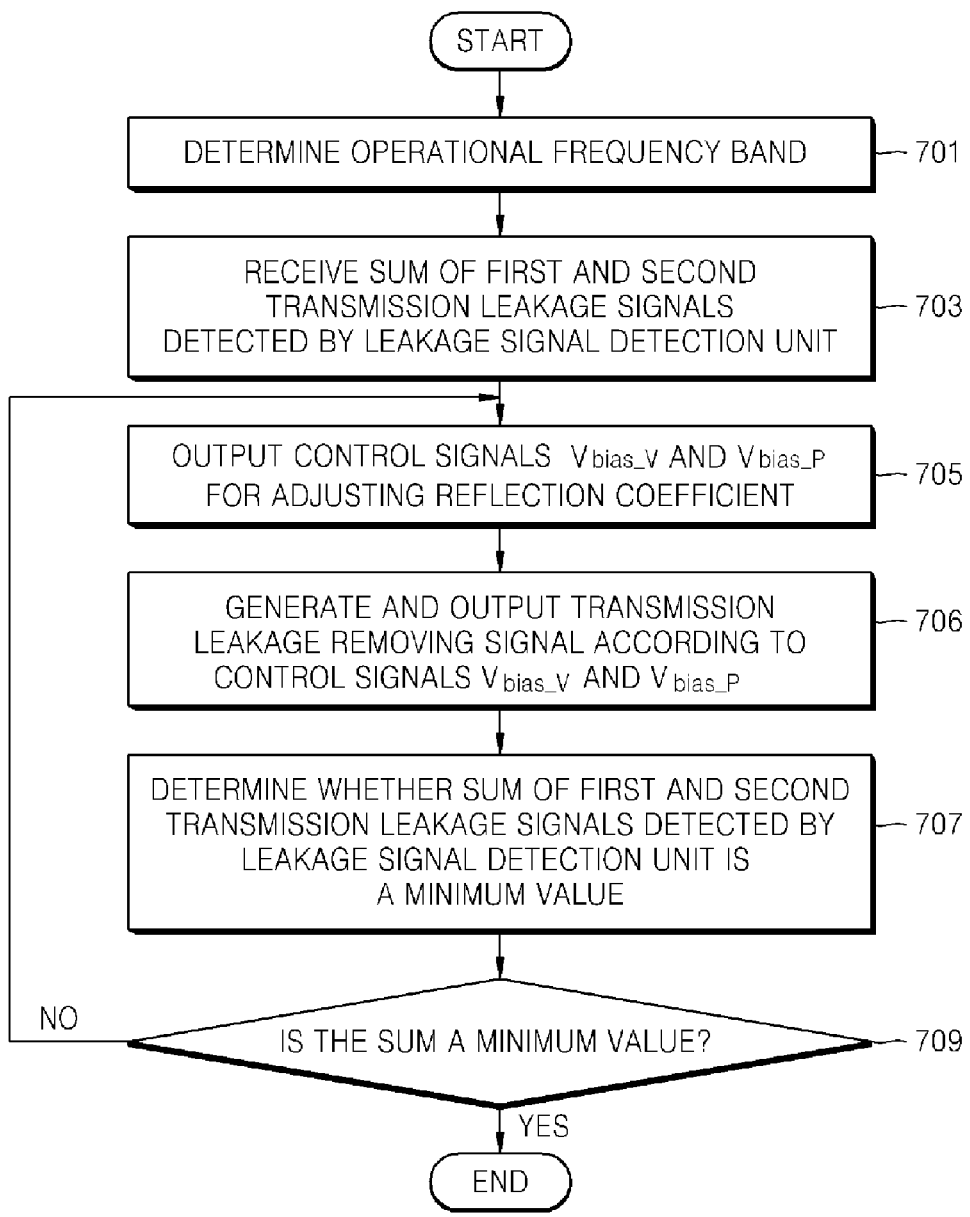

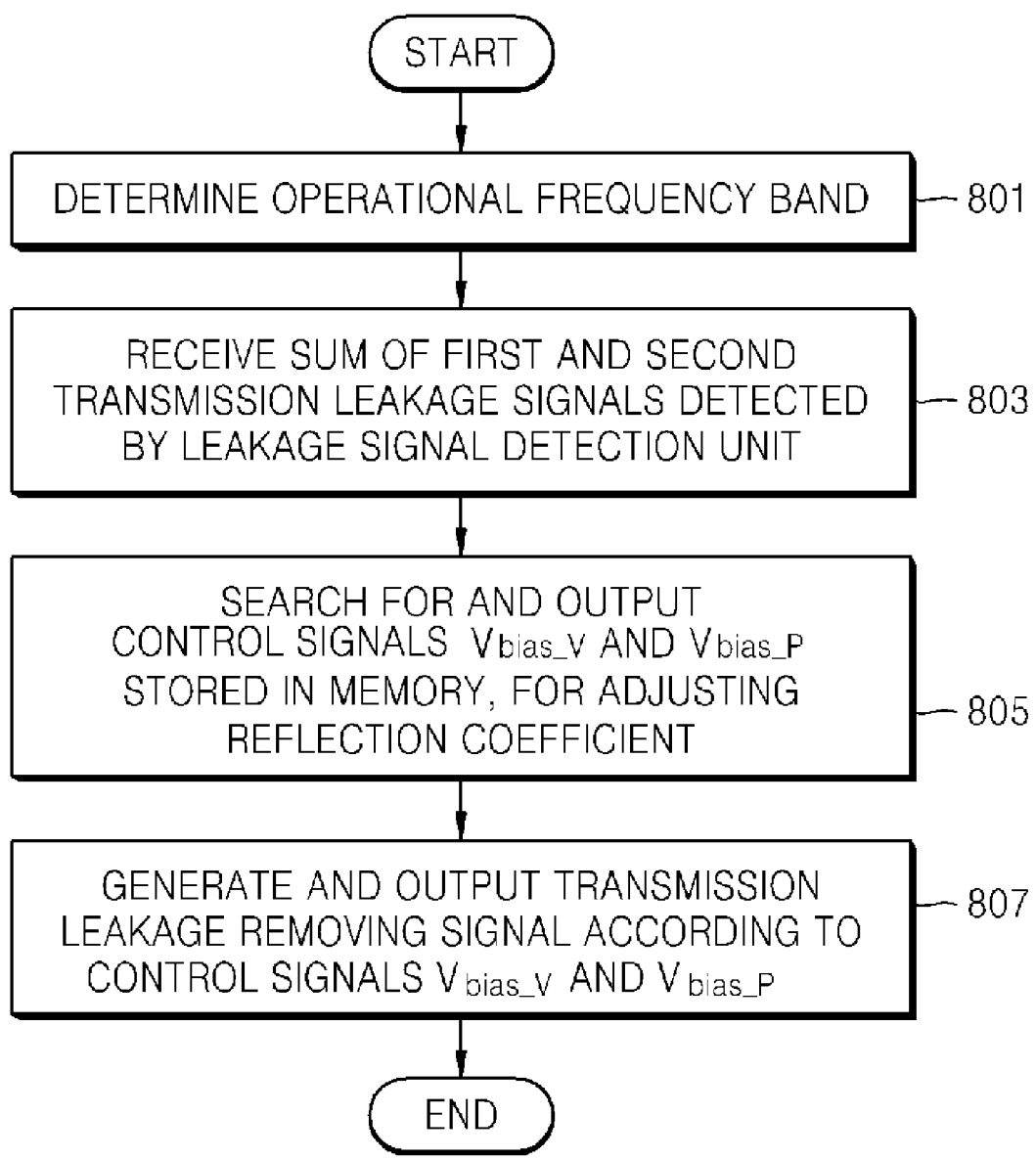

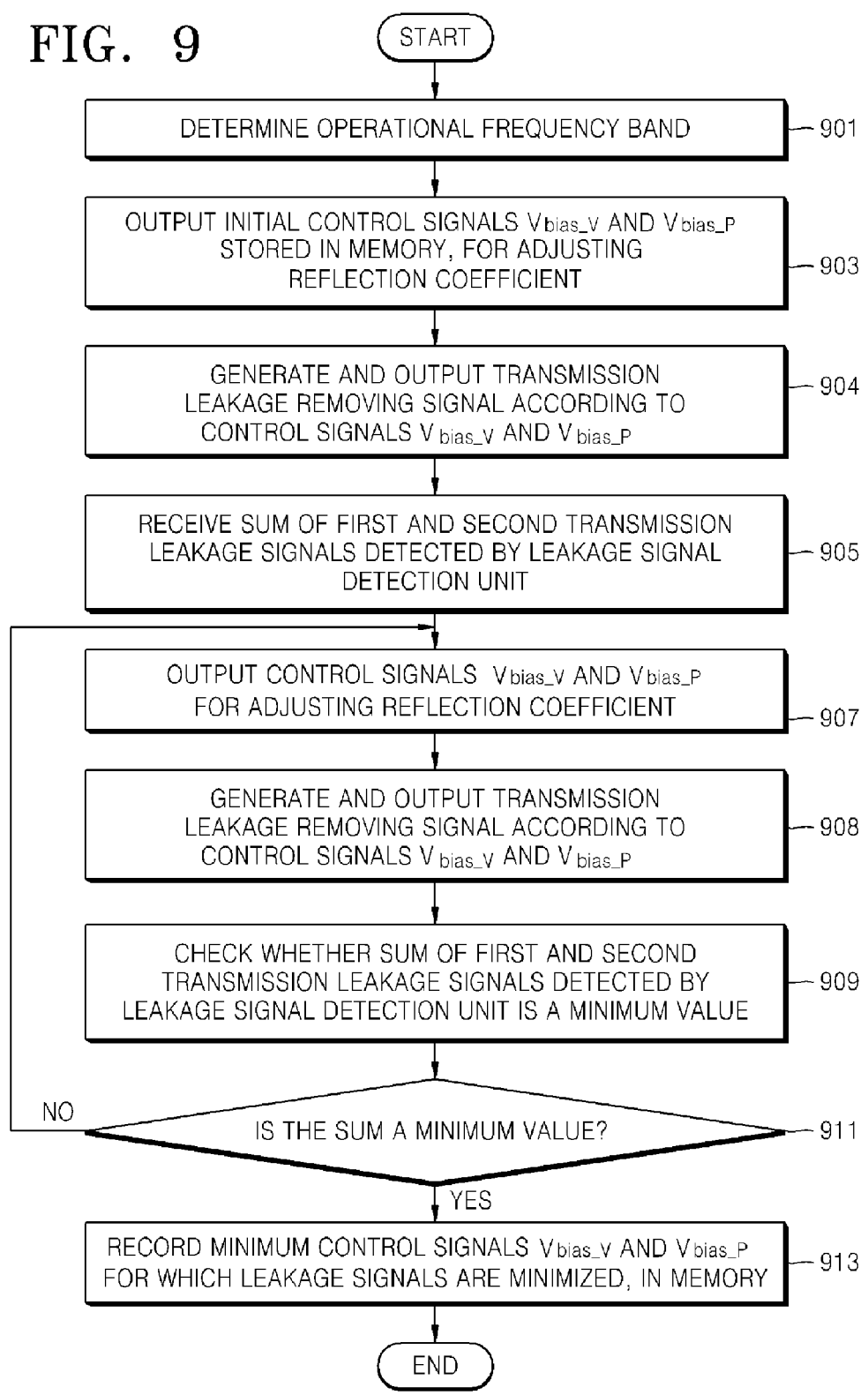

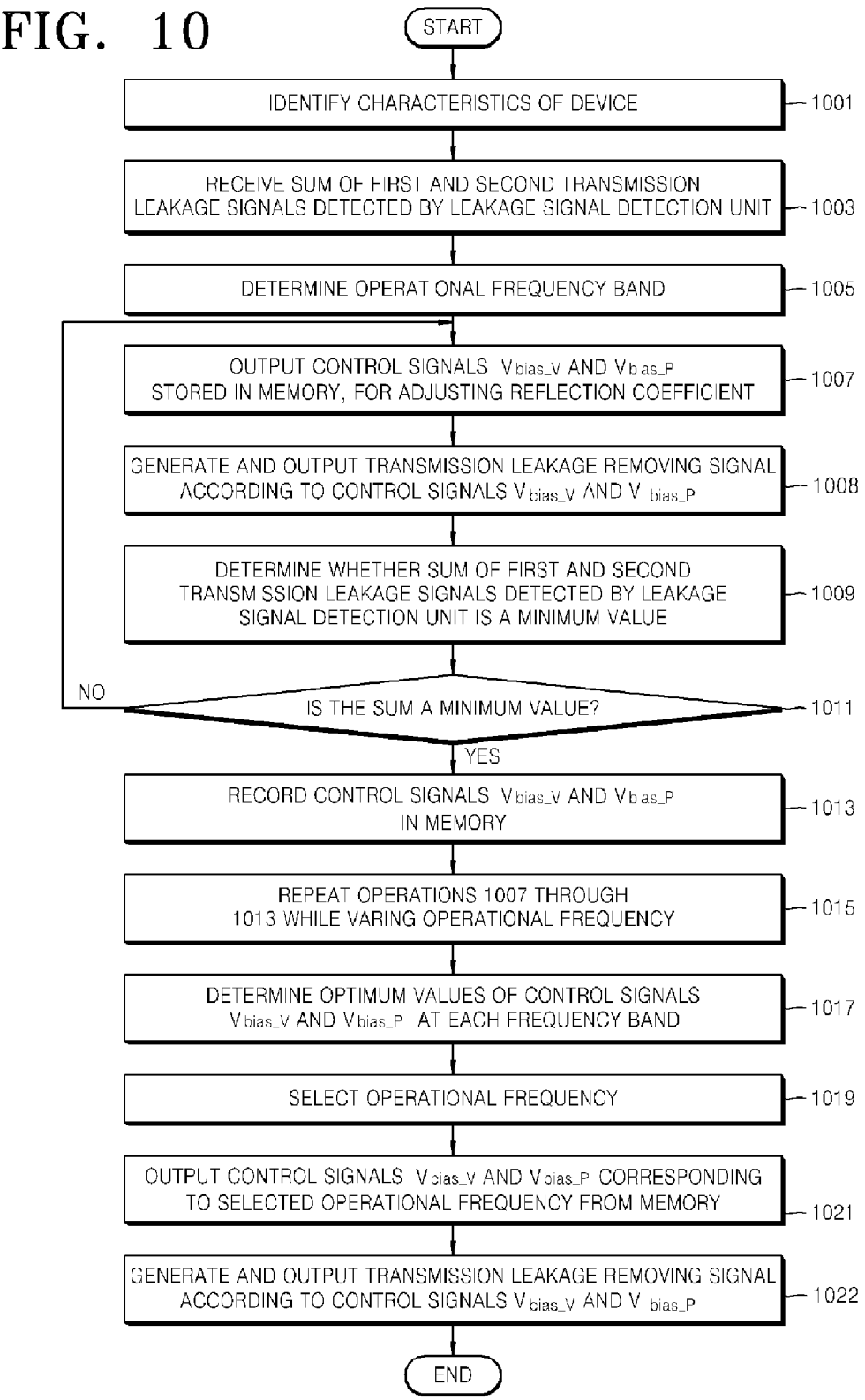

APPARATUS AND METHOD FOR REMOVING TRANSMISSION LEAKAGE SIGNAL

CROSS-REFERENCE TO RELATED PATENT APPLICATION

This application claims priority from Korean Patent Application No. 10-2008-0046503, filed on May 27, 2009, in the Korean Intellectual Property Office, the disclosure of which is incorporated herein in its entirety by reference.

BACKGROUND

1. Field of the Invention

Apparatuses and methods consistent with the present inventive concept relate to removing a transmission leakage signal in a radio frequency identification (RFID) reader.

2. Description of the Related Art

RFID is a wireless recognition technology for identifying and tracking a person, an object, or an animal by collecting information from an electronic chip (tag) attached thereto by using radio frequency (RF) waves. RFID is a main component of a ubiquitous sensor network (USN), that is, a network of intelligent sensors that integrates human, objects, and computers in various areas.

Unlike other mobile communication systems which use different transmission/reception frequencies, an RFID system uses a same frequency for transmitting and receiving signals and a signal may be transmitted simultaneously with receiving another signal. When different antennas are used for transmitting and receiving signals, the size of a transceiver module is larger, and a space for mounting the antennas and related costs increase.

In order to address this problem, a single antenna is used for both transmitting and receiving signals, together with a circulator or a directional coupler that separates transmission signals from reception signals behind the antenna. However, the circulator or the directional coupler is not an ideal device, and use of such device may lead to generation of a leakage signal when a transmission signal enters a path of a reception signal. Also, a leakage signal generated by a transmission signal may be input to a reception circuit due to impedance mismatch between a transceiver and the antenna.

The leakage signal generated by the transmission signal has a higher amplitude than a reception signal received via a tag and thus affects the reception signal, thereby decreasing a recognition rate of an RFID reader and generating problems such as linearity or noise in a reception circuit.

Accordingly, several methods of removing a leakage signal generated by a transmission signal in an RFID system including a circulator or a directional coupler have been proposed. In particular, in an RFID system that includes a directional coupler, the directional coupler has a smaller size and is cheaper than a circulator, and less circuits are additionally needed for removing a leakage signal. Thus, such RFID system may be used as a mobile RFID system.

However, in the case of an RFID system for an ultra high frequency (UHF) band, different frequency bands in the range of 840 MHz-960 MHz are used according to each country. Thus, an RFID system including a directional coupler cannot remove a leakage signal in all RFID bands used by different countries throughout the world, and in addition, the leakage signal cannot be removed when it varies according to environmental conditions. Thus, the use of such RFID system is limited.

SUMMARY

One or more exemplary embodiments provide an apparatus and method for removing a transmission leakage signal, whereby a transmission leakage signal may be easily removed in all frequency bands used by an RFID system.

One or more exemplary embodiments also provide an apparatus and method for removing a transmission leakage signal, whereby a recognition rate of a tag is increased by using a real-time approach to remove the transmission leakage signal even when the environmental conditions under which an RFID system is used change.

According to an exemplary embodiment, there is provided a transmission leakage signal removing apparatus including: a directional coupler connecting an antenna to a transmission path and a reception path; and a reflection coefficient adjustment unit outputting a reflection signal to the reception path, the reflection signal having a same amplitude as and an opposite phase to a sum of a first transmission leakage signal generated in the transmission path and input to the reception path, and a second transmission leakage signal reflected by the antenna and input to the reception path.

The reflection coefficient adjustment unit may include: a resistor, an inductor, and a capacitor, wherein the resistor, the inductor, and the capacitor are each formed of a lumped element or a distributed unit, and a resistance value of the resistor and a capacitance value of the capacitor are variable.

The resistor, the inductor, and the capacitor may be arranged in series, parallel, a mixed series-parallel structure, or multiple stages.

The transmission leakage signal removing apparatus may further include: a leakage signal detection unit detecting the first transmission leakage signal and the second transmission leakage signal; a control unit outputting a control signal used for generating the reflection signal a the reflection coefficient adjustment unit, wherein the reflection signal is generated in response to the control signal.

The reflection signal may be generated based on a signal originated from a transmission signal to be transmitted out through the antenna and reflected at a port disposed in front of the reflection coefficient adjustment unit.

The output value of the reflection signal is determined based on a value of the control signal.

The control unit may continuously output the control signal to the reflection coefficient adjustment unit until it is determined that the sum of the detected first and second transmission leakage signals is a minimum value at a given frequency, and wherein the control unit stores preset minimum values, including the minimum value, corresponding to a plurality of frequencies including the given frequency, respectively.

The control unit may further include a memory which stores a plurality of values for control signals, including the control signal, which values correspond to a plurality of different sums of the first and second transmission leakage signals, wherein the control signal has one of the plurality of values corresponding to the sum of the first and second transmission leakage signal, and the reflection coefficient adjustment unit outputs the reflection signal determined based on the control signal.

The reflection coefficient adjustment unit may include an inductor, a first diode, and a second diode, wherein the inductor is a lumped element or a distributed element, and output values of the first diode and second diode are adjusted in response to the leakage signal removing values.

The inductor, the first diode, and the second diode may be arranged in series, parallel, or multiple stages.

If it is determined that the sum of the detected first and second transmission leakage signals is the minimum value at the given frequency, the control unit may record in the memory a value of the control signal corresponding to the sum of the first and second transmission leakage signals of the minimum value.

According to another aspect of an exemplary embodiment, there is provided a method of removing a transmission leakage signal, the method comprising: (a) receiving a first transmission leakage signal generated in a transmission path of a directional coupler and input to a reception path of the directional coupler, and a second transmission leakage signal reflected by the antenna and input to the reception path; and (b) outputting a reflection signal to the reception path, the reflection signal having a same amplitude as and an opposite phase to a sum of the first transmission leakage signal and the second transmission leakage signal. Operation (b) may be repeated until it is determined that the sum of the received first and second transmission leakage signals is a minimum value at a given frequency, and wherein the minimum value is one of preset minimum values corresponding to a plurality of frequencies including the given frequency, respectively.

The method of removing a transmission leakage signal may further include (a2) storing in a memory a plurality of values for control signals, including the control signal, which values correspond to a plurality of different sums of the first and second transmission leakage signals including the sum of the first and second transmission leakage signals, wherein the control signal has one of the plurality of values corresponding to the sum of the first and second transmission leakage signal, and wherein the output value of the reflection signal is determined based on the control signal. Operations (a1) and (b) may be repeated until it is determined that the sum of the received first and second transmission leakage signals is a minimum value at a given frequency, and wherein the minimum value is one of preset minimum values corresponding to a plurality of frequencies including the given frequency, respectively.

If it is determined that the sum of the detected first and second transmission leakage signals is the minimum value at the given frequency, a value of the control signal corresponding to the sum of the first and second transmission leakage signals of the minimum value may be recorded in the memory.

As described above, according to the exemplary embodiments, a transmission leakage signal can be easily removed in all frequency bands used by an RFID system. Also, a recognition rate of a tag is increased by using a real-time approach so that the leakage signal can be removed even when the environmental conditions under which the RFID system is used change.

BRIEF DESCRIPTION OF THE DRAWINGS

The above and other aspects of the exemplary embodiments will be described with reference to the attached drawings, in which:

FIG. 7 is a flowchart of a method of removing a transmission leakage signal according to an exemplary embodiment;

FIG. 8 is a flowchart of a method of removing a transmission leakage signal according to another exemplary embodiment;

FIG. 9 is a flowchart of a method of removing a transmission leakage signal according to another exemplary embodiment; and FIG. 10 is a flowchart of a method of removing a transmission leakage signal according to another exemplary embodiment.

DETAILED DESCRIPTION OF EXEMPLARY EMBODIMENTS

The present inventive concept will now be described more fully with reference to the accompanying drawings.

Figure 1:
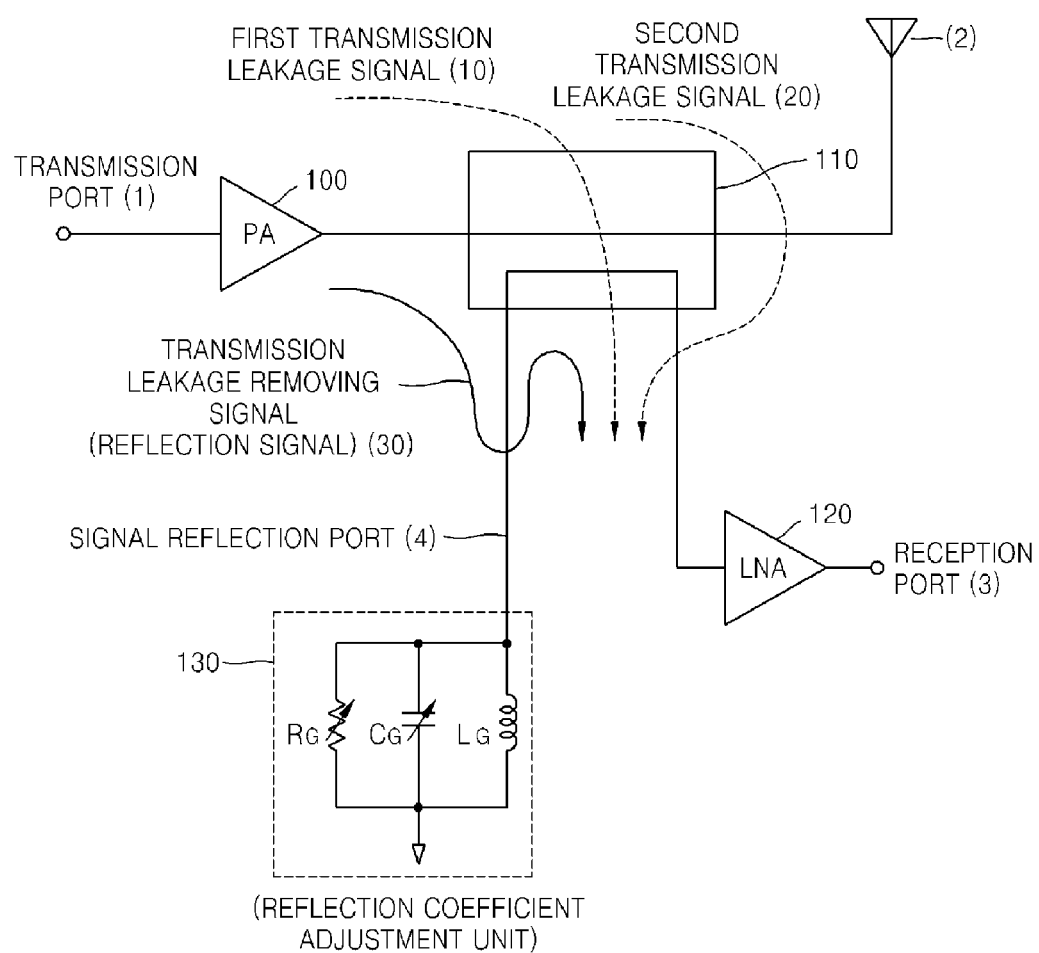
FIG. 1 is a structural diagram illustrating an apparatus for removing a transmission leakage signal according to an exemplary embodiment.
Figure 2A:
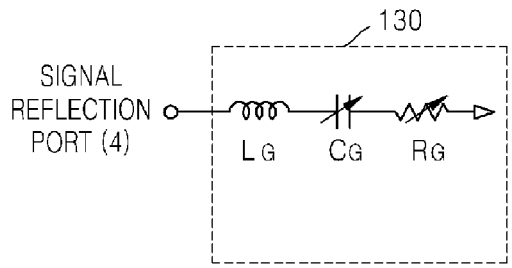
FIGS. 2A to 2H are detailed diagrams of a reflection coefficient adjustment unit of the apparatus of FIG. 1, according to exemplary embodiments.
Figure 2B:
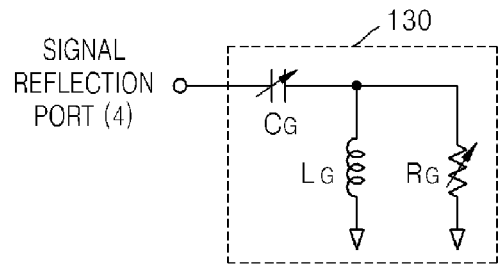
Figure 2C:
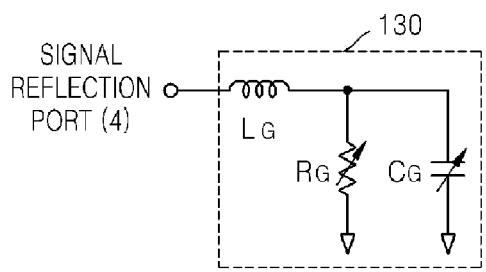
Figure 2D:
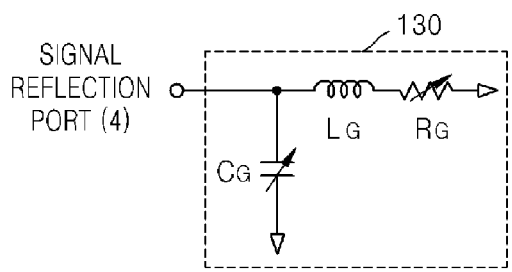
Figure 2E:
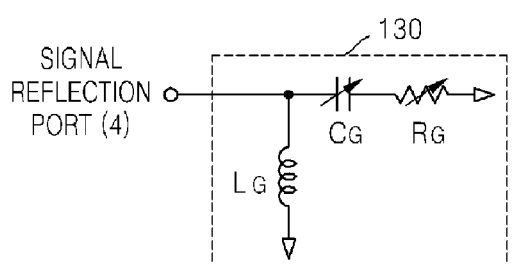
Figure 2F:
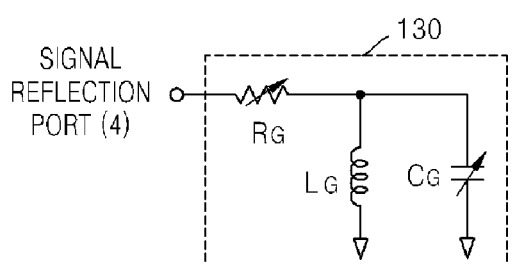
Figure 2G:
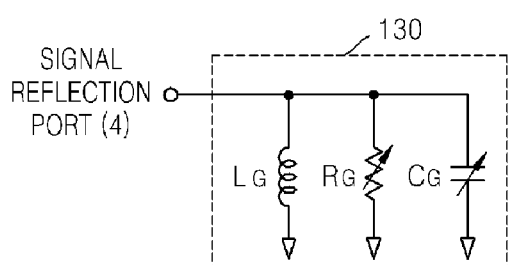
Figure 2H:
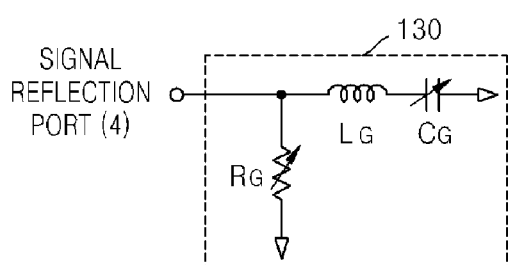

FIG. 1 is a structural diagram illustrating an apparatus for removing a transmission leakage signal according to an exemplary embodiment. The apparatus includes a power amplifier (PA) 100, a directional coupler 110, a low noise amplifier (LNA) 120, and a reflection coefficient adjustment unit 130. The directional coupler 110 includes four ports: a transmission port 1, a port for an antenna 2, a reception port 3, and a signal reflection port 4.

Hereinafter, basic operations of the apparatus of FIG. 1 will be described. First, a transmission signal from the transmission port 1 is amplified by the PA 100 and is input to the directional coupler 110. At this time, a first transmission leakage signal 10 is generated in the directional coupler 110 and input to the reception port 3. The amplified signal is transmitted from the directional coupler 110 to the antenna 2, and the antenna 2 generates an output signal and a reflection signal. This reflection signal is input to the reception port 3 as a second transmission leakage signal 20. Accordingly, a leakage signal that is input to the reception port 3 includes a sum of the first transmission leakage signal 10 and the second transmission leakage signal 20.

The first transmission leakage signal 10 and the second transmission leakage signal 20 input to the reception port 3 have higher amplitudes than a reception signal received by the reception port 3 from an outside of the FIG. 1 apparatus, and thus a design of the apparatus is difficult and a performance of the apparatus is degraded. A signal input output from the directional coupler 110 and input to the signal reflection port 4 is used by the reflection coefficient adjustment unit 130 included in the signal reflection port 4 to remove the first transmission leakage signal 10 and the second transmission leakage signal 20. This signal output from the directional coupler 110 to the signal reflection port 4 may be originated from the transmission signal, and reflected at the signal reflection port 4.

The reflection coefficient adjustment unit 130 generates a transmission leakage removing signal 30 based on the signal output from the directional coupler 110 to the signal reflection port 4. The transmission leakage removing signal 30 is input back to the signal reflection port 4. The transmission leakage removing signal 30 has the same amplitude as a sum of the first and second transmission leakage signals 10 and 20 but an opposite phase thereto, and is output to the reception port 3 via the directional coupler 110, thereby removing the first transmission leakage signal 10 and the second transmission leakage signal 20.

The reflection coefficient adjustment unit 130 includes a resistor $R_G$, a capacitor $C_G$, and an inductor $L_G$ arranged in parallel. The resistor $R_G$ may be a lumped element such as a lead resistor, a distributed element that can be represented by a transmission line, or a variable resistor having a resistance value that can be manually adjusted. The capacitor $C_G$ may be a lumped element such as a chip, a distributed element such as a microstrip line structure or a strip line structure, or a variable capacitor having a capacitance value that can be manually adjusted. The inductor $L_G$ may also be a lumped element or a distributed element such as a microstrip line structure or a strip line structure.

The inductor $L_G$ has a fixed inductance value, and the transmission leakage removing signal 30 may be generated by adjusting the resistance value of the resistor $R_G$ and/or the capacitance value of the capacitor $C_G$ and using a combination of the resistor $R_G$ and the capacitor $C_G$. Although the resistor $R_G$, the capacitor $C_G$, and the inductor $L_G$ are arranged in parallel in the reflection coefficient adjustment unit 130 in FIG. 1, the reflection coefficient adjustment unit 130 may include a series arrangement structure, a mixed series-parallel arrangement structure, or multiple stage structures, as shown in FIGS. 2A through 2H.

Figure 3:
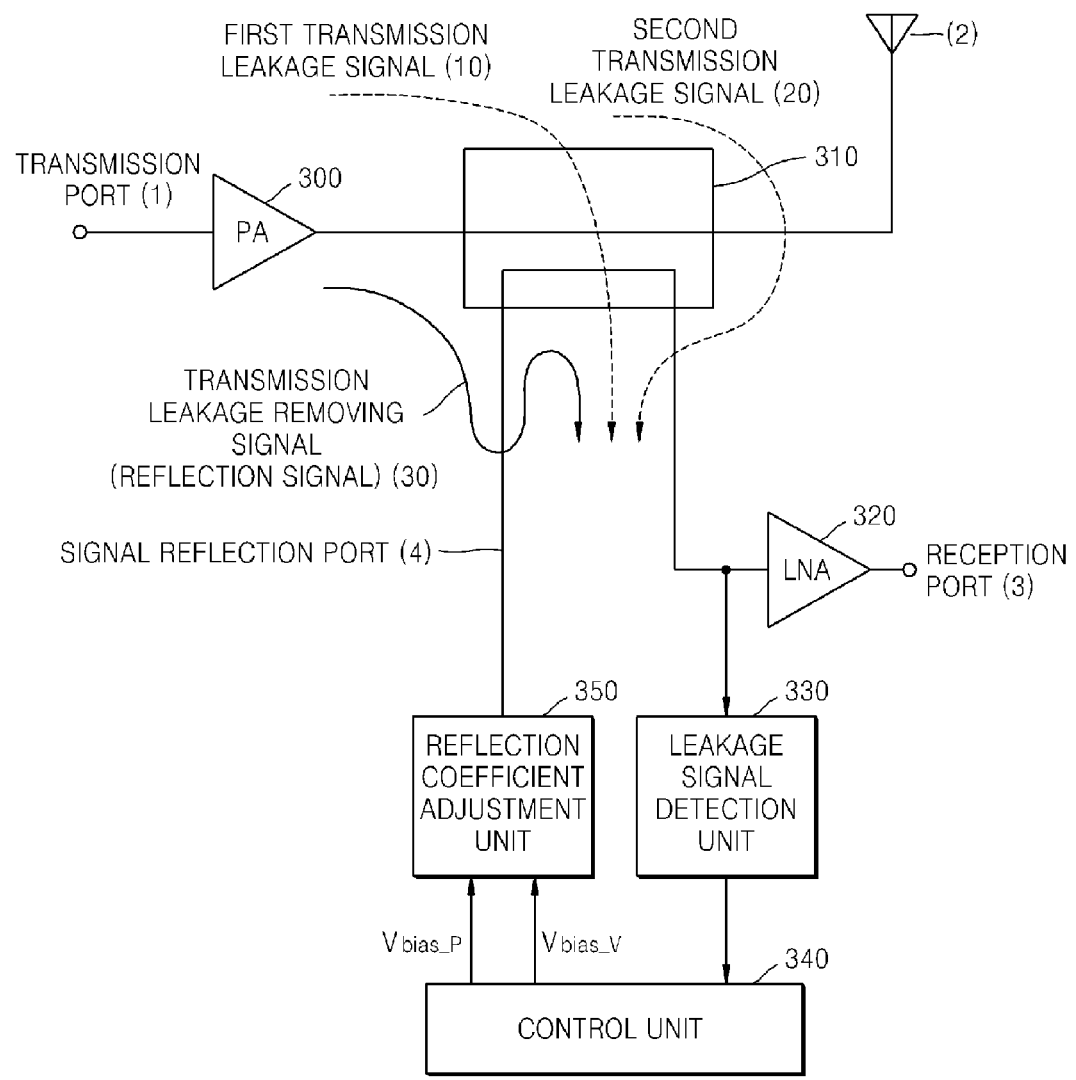
FIG. 3 is a structural diagram illustrating an apparatus for removing a transmission leakage signal according to another exemplary embodiment.

FIG. 3 is a structural diagram illustrating a transmission leakage signal removing apparatus according to another exemplary embodiment. The apparatus includes a PA 300, a directional coupler 310, an LNA 320, a leakage signal detection unit 330, a control unit 340, and a reflection coefficient adjustment unit 350. The directional coupler 310 includes four ports: a transmission port 1, a port for an antenna 2, a reception port 3, and a signal reflection port 4.

Hereinafter, basic operations of the apparatus of FIG. 3 will be described. A transmission signal input via the transmission port 1 is amplified in the PA 300 and input to the directional coupler 310. At this time, a first transmission leakage signal 10 is generated in the directional coupler 310 and input to the reception port 3. The amplified transmission signal is transmitted to the antenna 2, the antenna 2 generates an output signal and a second transmission leakage signal 20, and the second transmission leakage signal 20 is input to the reception port 3. A leakage signal input to the reception port 3 includes a sum of the first transmission leakage signal 10 and the second transmission leakage signal 20.

The leakage signal detection unit 330 detects the first transmission leakage signal 10 and the second transmission leakage signal 20 input to the reception port 3. The leakage signal detection unit 330 converts the detected signals to a leakage voltage signal, and outputs the same to the control unit 340. The leakage signal detection unit 330 may include a detection chip, a Schottky diode, and/or a transistor.

The control unit 340 receives the leakage voltage signal output from the leakage signal detection unit 330, generates a control signal for adjusting a reflection coefficient, and outputs the control signal to the reflection coefficient adjustment unit 350. Signals $V_{bias\_V}$ and $V_{bias\_P}$ are output as control signals for adjusting a reflection coefficient. The signal $V_{bias\_V}$ is for adjusting an output signal of a varactor diode, which will be described later, and the $V_{bias\_P}$ signal is for adjusting an output signal of a PIN diode. The control unit 340 generates a control signal(s) for adjusting a reflection coefficient until the leakage voltage signal output from the leakage signal detection unit 330 is minimized, and outputs the control signal(s) to the reflection coefficient adjustment unit 350.

The first transmission leakage signal 10 and the second transmission leakage signal 20 input to the reception port 3 have higher amplitudes than a reception signal received by the reception port 3 from an outside of the FIG. 3 apparatus, and thus a design of the apparatus is difficult and the performance of the apparatus is degraded. A signal output from the directional coupler 310 to the signal reflection port 4 is used to remove the first transmission leakage signal 10 and the second transmission leakage signal 20 by using the reflection coefficient adjustment unit 350 included in the signal reflection port 4. This signal output from the directional coupler 310 to the signal reflection port 4 may be originated from the transmission signal and reflected at the signal reflection port 4.

The reflection coefficient adjustment unit 350 generates a transmission leakage removing signal 30 based on the signal output from the directional coupler 110 and input to the signal reflection port 4. The transmission leakage removing signal 30 thus generated is input back to the signal reflection port 4, and has the same amplitude as and opposite phase to the sum of the first and second transmission leakage signals 10 and 20. The transmission leakage removing signal 30 is output to the reception port 3 via the directional coupler 310, thereby removing the first transmission leakage signal 10 and the second transmission leakage signal 20. The reflection coefficient adjustment unit 350 adjusts the transmission leakage removing signal 30 according to the signals $V_{bias\_V}$ and $V_{bias\_P}$, which are control signals transmitted from the control unit 340, and outputs the adjusted transmission leakage removing signal 30.

Figure 4A:
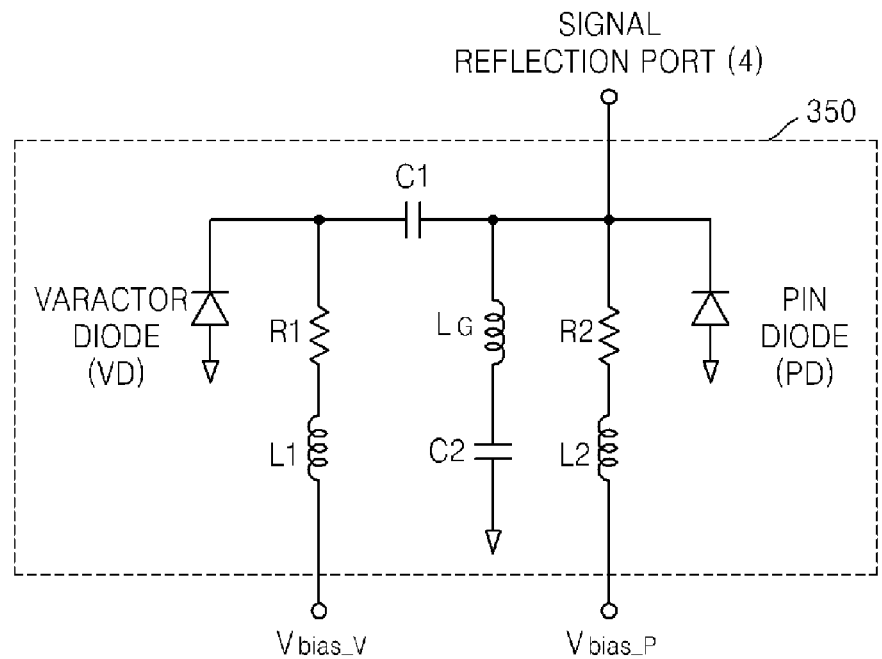
FIGS. 4A and 4B are detailed diagrams of a reflection coefficient adjustment unit of the apparatus of FIG. 3, according to exemplary embodiments.
Figure 4B:
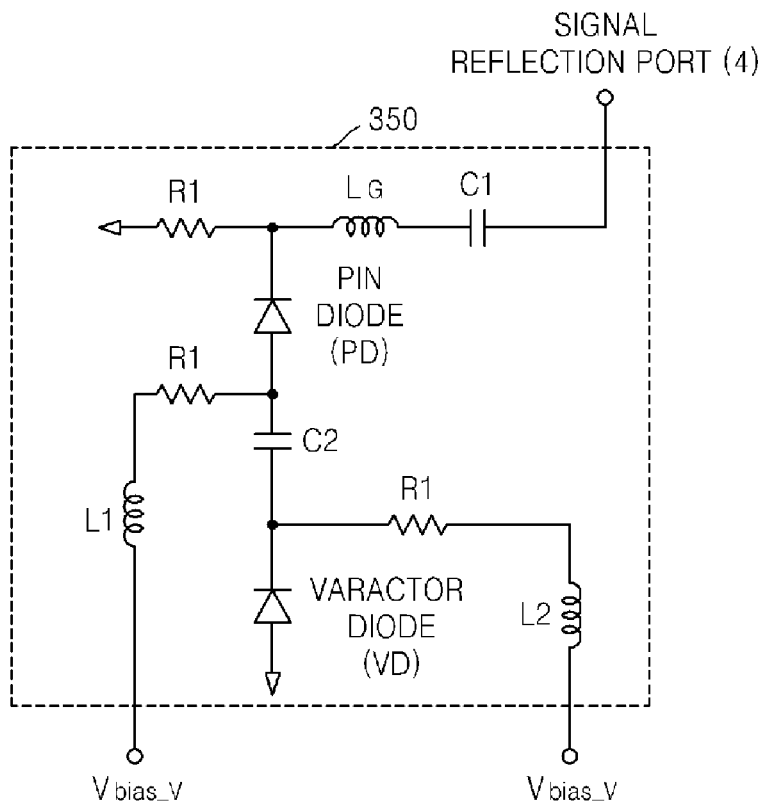

FIGS. 4A and 4B are diagrams of examples of the reflection coefficient adjustment unit 350, according to exemplary embodiments. Unlike the reflection coefficient adjustment unit 150 of FIG. 1, the reflection coefficient adjustment unit 350 includes an inductor $L_G$, a varactor diode, and a PIN diode. The inductor $L_G$ may be a lumped element or a distributed element such as a microstrip line structure or a strip line structure. The varactor diode has the same function as the capacitor $C_G$ of the exemplary embodiment of FIG. 1, and its output value may be electrically changed by using an analog signal or a digital signal. The output value of the varactor diode is changed by a signal $V_{bias\_V}$ output from the control unit 340. The PIN diode has the same function as the resistor $R_G$ of the embodiment of FIG. 1, and its output value may be electrically changed by using an analog signal or a digital signal. The output value of the PIN diode is changed by a signal $V_{bias\_P}$ output from the control unit 340.

In FIG. 4A, the inductor $L_G$, the varactor diode, and the PIN diode of the reflection coefficient adjustment unit 350 are arranged in parallel, and in FIG. 4B, the inductor $L_G$, the varactor diode, and the PIN diode of the reflection coefficient adjustment unit 350 are arranged in series. In addition, the inductor $L_G$, the varactor diode, and the PIN diode of the reflection coefficient adjustment unit 350 may be arranged in a mixed series-parallel structure, or in a multiple stage structure.

The reflection coefficient adjustment unit 350 receives the control signals $V_{bias\_V}$ and $V_{bias\_P}$ from the control unit 340 to generate the transmission leakage removing signal 30, and outputs the same to the reception port 3 via the directional coupler 310, thereby removing the first transmission leakage signal 10 and the second transmission leakage signal 20.

Figure 5:
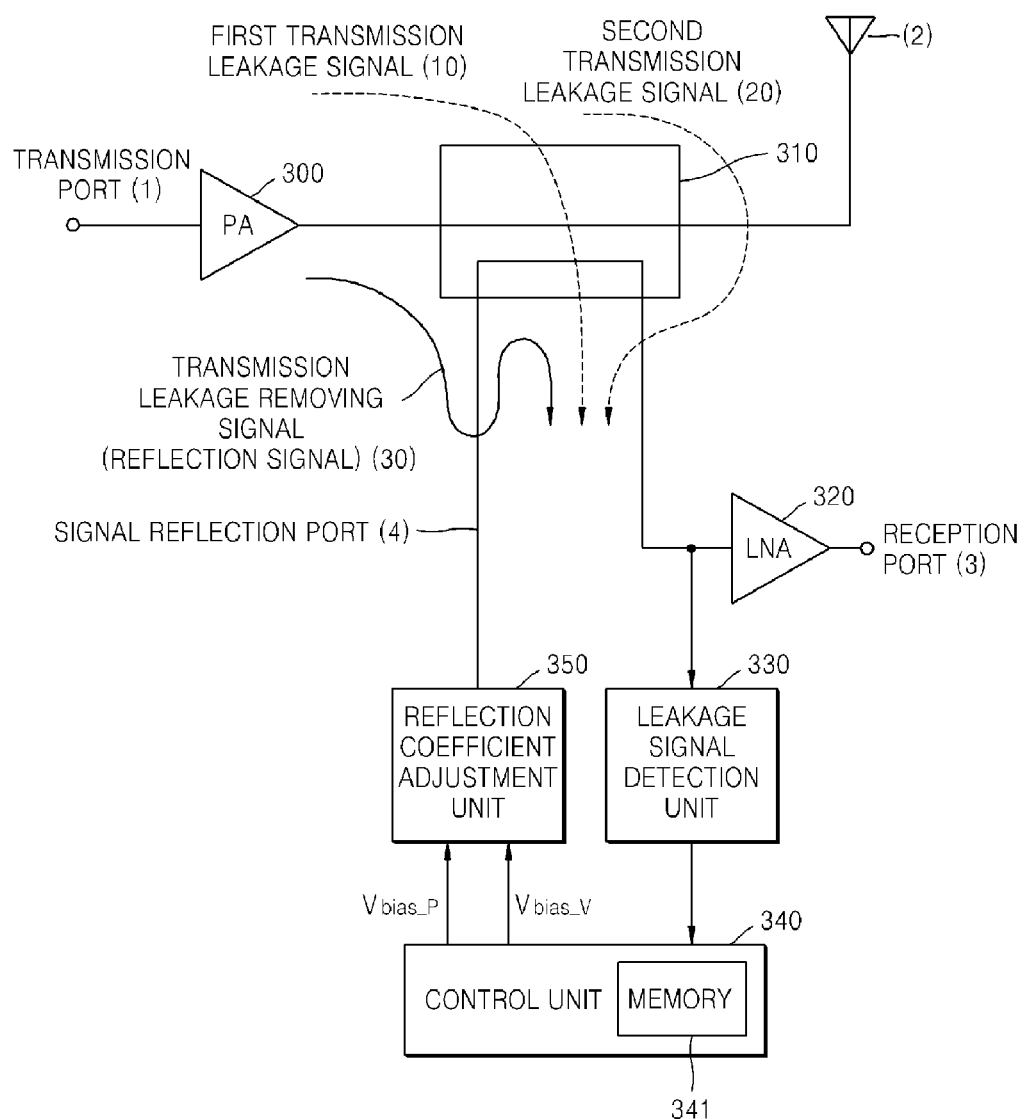
FIG. 5 is a structural diagram illustrating an apparatus for removing a transmission leakage signal according to another exemplary embodiment.

FIG. 5 is a structural diagram illustrating a transmission leakage signal removing apparatus according to another exemplary embodiment. Compared to the apparatus of FIG. 3, the apparatus of FIG. 5 further includes a memory 341 in a control unit 340.

Control signals $V_{bias\_V}$ and $V_{bias\_P}$ corresponding to the first transmission leakage signal 10 and the second transmission leakage signal 20, that is, control signals according to a leakage voltage signal output from a leakage signal detection unit 330, are stored in the memory 341.

A control unit 340 receives a leakage voltage signal output from the leakage signal detection unit 330, and outputs control signals corresponding to the leakage voltage signal, based on the control signals and the corresponding leakage voltage signal stored in the memory 341. Then, when the leakage voltage signal output from the leakage signal detection unit 330 is minimized, the control unit 340 records the leakage voltage signal and the controls signals in the memory 341.

Other elements of the apparatus of FIG. 5 are the same as those of the apparatus of FIG. 3, and thus description thereof will be omitted.

Figure 6A:
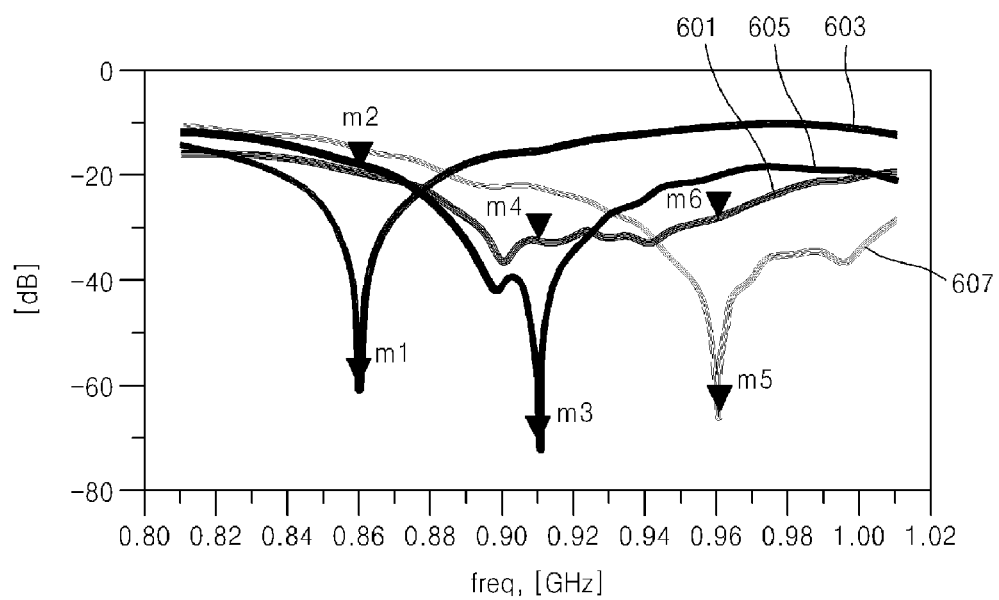
FIGS. 6A and 6B illustrate response characteristics with respect to a frequency input of a related art RFID system and RFID systems respectively including the apparatuses of FIGS. 3 and 5, according to exemplary embodiments.
Figure 6B:
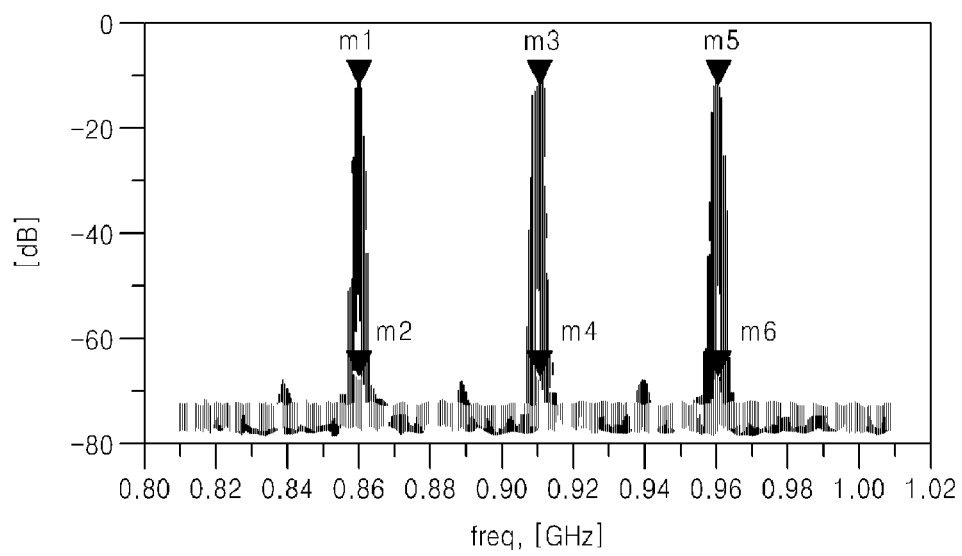

FIGS. 6A and 6B are graphs showing response characteristics according to a frequency input of a related art RFID system and RFID systems respectively including the apparatuses of FIGS. 3 and 5, respectively.

Referring to FIG. 6A, a graph 601 shows dB values of leakage signals measured at a front end of an LNA (not shown) in a range of 860 MHz-960 MHz in an RFID system including a related art directional coupler by using a network analyzer for measuring response characteristics of the RFID system with respect to a frequency input. In FIG. 6A, m2 is a response characteristic measured at 860 MHz, m4 is a response characteristic measured at 910 MHz, and m6 is a response characteristic measured at 960 MHz.

A graph 603 denotes a response characteristic of an RFID system after adjusting the control signals $V_{bias\_V}$ and $V_{bias\_P}$ so as to remove the first and second leakage signals 10 and 20 at 860 MHz according to the embodiments of FIGS. 3 and 5. Upon comparing m1 of the graph 603 with m2 of the graph 601, it can be seen that the leakage signal is reduced by about 40 dB at 860 MHz according to an exemplary embodiment.

A graph 605 denotes a response characteristic of an RFID system after adjusting the control signals $V_{bias\_V}$ and $V_{bias\_P}$ so as to remove the first and second leakage signals 10 and 20 at 910 MHz according to the embodiments of FIGS. 3 and 5. Upon comparing m3 of the graph 605 with m4 of the graph 601, it can be seen that the leakage signal is reduced by about 40 dB at 910 MHz according to an exemplary embodiment.

A graph 607 denotes a response characteristic of an RFID system after adjusting the control signals $V_{bias\_V}$ and $V_{bias\_P}$ so as to remove the first and second leakage signals 10 and 20 at 960 MHz according to the embodiments of FIGS. 3 and 5. Upon comparing m5 of the graph 607 with m6 of the graph 601, it can be seen that the leakage signal is reduced by about 40 dB at 960 MHz according to an exemplary embodiment.

As can be seen from FIG. 6A, the RFID system according to the exemplary embodiments operates stably in the range of 860 MHz-960 MHz by adjusting the control signals $V_{bias\_V}$ and $V_{bias\_P}$.

In FIG. 6B, m1, m3, and m5 show dB values of leakage signals measured in a range of 860 MHz-960 MHz at a front end of an LNA in an RFID system including a related art directional coupler by using a spectrum analyzer for measuring response characteristics of the RFID system with respect to a frequency input.

In FIG. 6B, m2, m4, and m6 show dB values of the sum of the first and second leakage signals measured at a front end of the LNA 320 by using a spectrum analyzer (not shown) after inputting signals at 860 MHz, 910 MHz, and 960 MHz, respectively, to the transmission port 1 and adjusting the control signals $V_{bias\_V}$ and $V_{bias\_P}$ to minimize the first and second leakage signals 10 and 20 of the RFID systems including the apparatus according to the exemplary embodiments of FIGS. 3 and 5.

As can be seen from FIG. 6B, when comparing m2, m4, and m6 with m1, m3, and m5 of the related art, the leakage signals are reduced by about 70 dB.

Hereinafter, methods of removing a transmission leakage signal according to exemplary embodiments will be described with respect to FIGS. 7 through 10. The methods may be performed in the control unit 340 as illustrated in FIG. 3 or FIG. 5, with the help of peripheral components in the apparatus for removing a transmission leakage signal.

According to an exemplary embodiment, the leakage signal detection unit 330 and the reflection coefficient adjustment unit 350 are placed outside the control unit 340; however, they may be included in the control unit 340 and a leakage signal may be removed only by an operation of the control unit 340.

First, a method of removing a transmission leakage signal according to an exemplary embodiment will be described with reference to FIG. 7.

In operation 701, an operational frequency band is determined in a frequency band range of 840 MHz-960 MHz, and then in operation 703, the control unit 340 receives a sum of leakage signals (the first transmission leakage signal 10 and the second transmission leakage signal 20) detected by the leakage signal detection unit 330. That is, the leakage signal detection unit 330 converts the sum of the detected leakage signals to a leakage voltage signal and outputs the same to the control unit 340.

In operation 705, the control unit 340 receives the leakage voltage signal converted in the leakage signal detection unit 330, and generates control signals $V_{bias\_V}$ and $V_{bias\_P}$ for adjusting a reflection coefficient, and outputs the control signals $V_{bias\_V}$ and $V_{bias\_P}$ to the reflection coefficient adjustment unit 350. Then, in operation 706, the reflection coefficient adjustment unit 350 generates a reflection signal, that is, a transmission leakage removing signal 30, according to the control signals $V_{bias\_V}$ and $V_{bias\_P}$ and outputs the transmission leakage removing signal 30 to the reception port 3 of the directional coupler 310.

Next, in operation 707, the control unit 340 determines whether the sum of the leakage signals is a minimum value. The control unit 340 may have stored preset minimum values corresponding to a plurality of frequency bands, respectively, in the range of 840 MHz-960 MHz.

In operation 709, if the control unit 340 determines that the next sum of the leakage signals is a minimum value, the method is ended, and if the sum is not a minimum value, the method goes back to operation 705 to generate other control signals $V_{bias\_V}$ and $V_{bias\_P}$ for adjusting the reflection coefficient and outputs the other control signals $V_{bias\_V}$ and $V_{bias\_P}$ to the reflection coefficient adjustment unit 350.

Next, a method of removing a transmission leakage signal according to an exemplary embodiment will be described with reference to FIG. 8. In the current exemplary embodiment of FIG. 8, the memory 341 is further included in the control unit 340, compared to the exemplary embodiment of FIG. 7. Control signals $V_{bias\_V}$ and $V_{bias\_P}$ according to a leakage voltage signal output from the leakage signal detection unit 330 are stored in the memory 341.

In operation 801, an operational frequency band is determined in a frequency band range of 840 MHz-960 MHz. In operation 803, the control unit 340 receives a sum of leakage signals detected by the leakage signal detection unit 330. For this operation, the leakage signal detection unit 330 converts the detected leakage signals to a leakage voltage signal and outputs the same to the control unit 340.

In operation 805, the control unit 340 searches for the control signals $V_{bias\_V}$ and $V_{bias\_P}$ corresponding to the received leakage voltage signal, in the memory 341. These control signals $V_{bias\_V}$ and $V_{bias\_P}$ are output to the reflection coefficient adjustment unit 350 for adjusting a reflection coefficient according to the received leakage voltage signal. In operation 807, the reflection coefficient adjustment unit 350 that has received the control signals outputs a reflection signal, that is, a transmission leakage removing signal 30, to the reception port 3 of the directional coupler 310.

Next, a method of removing a transmission leakage signal according to an exemplary embodiment will be described with reference to FIG. 9. Compared to the exemplary embodiment of FIG. 8, in the current exemplary embodiment of FIG. 9, initial control signals $V_{bias\_V}$ and $V_{bias\_P}$ are stored in the memory 341 for each operational frequency band.

In operation 901, an operational frequency band is determined among a frequency band range of 840 MHz-960 MHz, and in operation 903, the control unit 340 determines initial control signals $V_{bias\_V}$ and $V_{bias\_P}$ corresponding to the determined operational frequency band from the memory 341. The determined initial control signals are output to the reflection coefficient adjustment unit 350 to generate a reflection signal, that is, a transmission leakage removing signal 30, and outputs the same to the reception port 3 of the directional coupler 310 in operation 904.

Next, in operation 905, the control unit 340 receives a sum of leakage signals detected by the leakage signal detection signal 330. The leakage signal detection unit 330 converts the detected leakage signals into a leakage voltage signal and outputs the same to the control unit 340.

In operation 907, the control unit 340 searches for control signals corresponding to the received leakage voltage signal, from the memory 341. These control signals are output to the reflection coefficient adjustment unit 350 for adjusting a reflection coefficient according to the received leakage voltage signal. In operation 908, the reflection coefficient adjustment unit 350 which has received the control signals outputs a reflection signal, that is, a transmission leakage removing signal 30, to the reception port 3 of the directional coupler 310.

Next, in operations 909 and 911, the control unit 340 determines whether the sum of the leakage signals is a minimum value. The memory 341 may have stored preset minimum values corresponding to a plurality of frequency bands, respectively, in the range of 840 MHz-960 MHz.

In operation 913, if the control unit 340 determines that the sum is the minimum value, the control unit 340 records control signals $V_{bias\_V}$ and $V_{bias\_P}$ for which the sum of the leakage signals is the minimum value, to the memory 341 and ends the process.

If the control unit 340 determines that the sum of the leakage signals is not the minimum value, the method goes back to operation 907 to generate other control signals $V_{bias\_V}$ and $V_{bias\_P}$ for adjusting a reflection coefficient and output the same to the reflection coefficient adjustment unit 350.

Next, a method of removing a transmission leakage signal according to an exemplary embodiment will be described with reference to FIG. 10. In the current exemplary embodiment, control signals having a minimum value for each frequency band are generated and stored in a memory 341, and corresponding control signals of a selected operational frequency band are searched for from the memory 341 and apply to the apparatus for removing a transmission leakage signal.

In operation 1001, characteristics of a device are identified by frequency sweeping in order to sense characteristics for each frequency band in the range of 840 MHz-960 MHz.

In operation 1003, the control unit 340 receives a sum of leakage signals detected by the leakage signal detection unit 330, and determines an operational frequency band in operation 1005.

At the fixed operational frequency, the control unit 340 generates control signals $V_{bias\_V}$ and $V_{bias\_P}$ for adjusting a reflection coefficient and outputs the same to the reflection coefficient adjustment unit 350 in operation 1007. The reflection coefficient adjustment unit 350 that has received the control signals $V_{bias\_V}$ and $V_{bias\_P}$ outputs a reflection signal, that is, a transmission leakage removing signal 30, to the reception port 3 of the directional coupler 310, in operation 1008.

Next, the control unit 340 determines whether the sum is a minimum value in operations 1009 and 1011. The memory 341 may have stored preset minimum values corresponding to a plurality of frequency bands, respectively, in the range of 840 MHz-960 MHz.

If the control unit 340 determines that the sum of the leakage signals is the minimum value, the control unit 340 records the control signals $V_{bias\_V}$ and $V_{bias\_P}$ for which the sum of the leakage signals is the minimum value, to the memory 341 in operation 1013. However, if the sum of the leakage signals is not the minimum value, the method goes back to operation 1007 and generates other control signals for adjusting a reflection coefficient and outputs the same to the reflection coefficient adjustment unit 350.

Next, in operation 1015, the control unit 340 repeats operations 1007 through 1013 after changing the operational frequency band.

When control signals for which the sum of the leakage signals has a minimum value for adjusting a reflection coefficient in all frequency bands in the range of 840 MHz-960 MHz are recorded to the memory 341, the control unit 340 determines an optimum value for the control signals $V_{bias\_V}$ and $V_{bias\_P}$ in each frequency band in operation 1017.

Next, an operational frequency band is selected in operation 1019, and in operation 1021, control signals $V_{bias\_V}$ and $V_{bias\_P}$ corresponding to the selected operational frequency band are output from the memory 341 to the reflection coefficient adjustment unit 350. The reflection coefficient adjustment unit 350 that has received the control signals $V_{bias\_V}$ and $V_{bias\_P}$ outputs a reflection signal, that is, a transmission leakage removing signal 30, to the reception port 3 of the directional coupler 310, in operation 1022.

While the inventive concept has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the inventive concept is defined not by the detailed description of the invention but by the appended claims, and all differences within the scope will be construed as being included in the present inventive concept.

What is claimed is:

1. A transmission leakage signal removing apparatus comprising:
   a directional coupler which connects an antenna to a transmission path and a reception path;
   a reflection coefficient adjustment unit which outputs a reflection signal to the reception path, the reflection signal having a same amplitude as and an opposite phase to a sum of a first transmission leakage signal generated in the transmission path and input to the reception path and a second transmission leakage signal reflected by the antenna and input to the reception path: and a control unit which outputs a control signal to control generating the reflection signal at the reflection coefficient adjustment unit, wherein the reflection coefficient adjustment unit comprises a inductor, a first diode, and a second diode, and wherein the inductor is a lumped element or a distributed element, and output values of the first diode and the second diode are electrically adjusted in response to the control signal.

2. The transmission leakage signal removing apparatus of claim 1, wherein the reflection signal is generated based on a signal originated from a transmission signal to be transmitted by the antenna and reflected at a port disposed in front of the reflection coefficient adjustment unit.

3. The transmission leakage signal removing apparatus of claim 1, further comprising:

a leakage signal detection unit which detects the first transmission leakage signal and the second transmission leakage signal wherein the reflection signal is generated in response to the control signal.

4. The transmission leakage signal removing apparatus of claim 1, wherein the inductor, the first diode and the second diode are arranged in series, parallel, or multiple stages.

5. The transmission leakage signal removing apparatus of claim 3, wherein the reflection signal is generated based on a signal originated from a transmission signal to be transmitted by the antenna and reflected at a port disposed in front of the reflection coefficient adjustment unit.

6. The transmission leakage signal removing apparatus of claim 3, wherein an output value of the reflection signal is determined based on a value of the control signal.

7. The transmission leakage signal removing apparatus of claim 6, wherein the control unit continuously outputs the control signal to the reflection coefficient adjustment unit until it is determined that the sum of the detected first and second transmission leakage signals is a minimum value at a given frequency, and wherein the control unit stores preset minimum values, including the minimum value, corresponding to a plurality of frequencies including the given frequency, respectively.

8. The transmission leakage signal removing apparatus of claim 7, wherein, by continuously outputting the control signal, the control unit changes the output value of the reflection signal.

9. The transmission leakage signal removing apparatus of claim 8, wherein the first diode is a varactor diode and the second diode is a PIN diode, and wherein the output value of the reflection signal is changed by changing one of a value of the varactor diode and a value of the PIN diode.

10. The transmission leakage signal removing apparatus of claim 3, wherein the control unit comprises a memory which stores a plurality of values for control signals, including the control signal, which values correspond to a plurality of different sums of the first and second transmission leakage signals including the sum of the first and second transmission leakage signals,, wherein the control signal has one of the plurality of values corresponding to the sum of the first and second transmission leakage signal, and wherein the reflection coefficient adjustment unit outputs the reflection signal determined based on the control signal.

11. The transmission leakage signal removing apparatus of claim 10, wherein the reflection signal is generated based on a signal originated from a transmission signal to be transmitted by the antenna and reflected at a port disposed in front of the reflection coefficient adjustment unit.

12. The transmission leakage signal removing apparatus of claim 10, wherein the inductor is a lumped element or a distributed element, and output values of the first diode and second diode are adjusted based on the control signal to output the reflection signal.

13. The transmission leakage signal removing apparatus of claim 11, wherein the control unit continuously outputs the control signal to the reflection coefficient adjustment unit until it is determined that the sum of the detected first and second transmission leakage signals is a minimum value at a given frequency, and wherein the control unit stores in the memory preset minimum values, including the minimum value, corresponding to a plurality of frequencies including the given frequency, respectively.

14. The transmission leakage signal removing apparatus of claim 13, wherein if it is determined that the sum of the detected first and second transmission leakage signals is a minimum value at the given frequency, the control unit records in the memory a value of the control signal corresponding to the sum of the first and second transmission leakage signals of the minimum value.

15. A method of removing a transmission leakage signal, the method comprising:

(a) receiving a first transmission leakage signal generated in a transmission path of a directional coupler and input to a reception path of the directional coupler, and a second transmission leakage signal reflected by the antenna and input to the reception path; and (b) outputting a reflection signal to the reception path, the reflection signal having a same amplitude as and an opposite phase to a sum of the first transmission leakage signal and the second transmission leakage signal, wherein operation (b) is repeated until it is determined that the sum of the received first and second transmission leakage signals is a minimum value at a given frequency, and wherein the minimum value is one of preset minimum values corresponding to a plurality of frequencies including the given frequency, respectively.

16. The method of claim 15, wherein the reflection signal is generated based on a signal originated from a transmission signal to be transmitted by the antenna and reflected at a port disposed in front of a reflection coefficient adjustment unit that outputs the reflection signal.

17. The method of claim 15, further comprising:

(a1) generating a control signal to control the outputting the reflection signal such that an output value of the reflection signal is determined based on a value of the control signal.

18. The method of claim 15, wherein, by continuously outputting the control signal, the output value of the reflection signal is changed.

19. A method of removing a transmission leakage signal, the method comprising:

(a) receiving a first transmission leakage signal generated in a transmission path of a directional coupler and input to a reception path of the directional coupler, and a second transmission leakage signal reflected by the antenna and input to the reception path;

(b) outputting a reflection signal to the reception path, the reflection signal having a same amplitude as and an opposite phase to a sum of the first transmission leakage signal and the second transmission leakage signal;

(c) generating a control signal to control the outputting the reflection signal such that an output value of the reflection signal is determined based on a value of the control signal; and (d) storing in a memory a plurality of values for control signals, including the control signal, which values correspond to a plurality of different sums of the first and second transmission leakage signals including the sum of the first and second transmission leakage signals, wherein the control signal has one of the plurality of values corresponding to the sum of the first and second transmission leakage signal, and wherein the output value of the reflection signal is determined based on the control signal.

20. The method of claim 19, wherein operations (c) and (b) are repeated until it is determined that the sum of the received first and second transmission leakage signals is a minimum value at a given frequency, and wherein the minimum value is one of preset minimum values corresponding to a plurality of frequencies including the given frequency, respectively.

21. The method of claim 20, wherein if it is determined that the sum of the detected first and second transmission leakage signals is the minimum value at the given frequency, a value of the control signal corresponding to the sum of the first and second transmission leakage signals of the minimum value are recorded in the memory.

* * * * *